INVENTOR.
Allen R. Perrins

United States Patent Office 3,535,618
Patented Oct. 20, 1970

3,535,618
ROTATIVE INDUCTIVE ELECTRICAL COUPLING
Allen R. Perrins, Cheshire, Conn., assignor to The Superior Electric Company, Bristol, Conn., a corporation of Connecticut
Filed Jan. 8, 1969, Ser. No. 789,874
Int. Cl. H01f 21/04, 29/12
U.S. Cl. 323—50                                  8 Claims

ABSTRACT OF THE DISCLOSURE

A rotative inductive coupling for transmitting electrical power from a stationary primary coil to a rotating secondary coil and providing an indication if the power is utilized in a circuit connected to the rotating coil with the coupling being accurate in use over an extremely wide temperature range even with a relatively low degree of flux linkage between the coils by the incorporation of another stationary primary coil in bridge circuit arrangement with the first stationary primary coil to provide for temperature compensation.

---

One manner of transmitting electrical power between a stationary member and a rotating member has been to provide a coil mounted on the stationary member and a coil mounted on the rotating member. A magnetic core is usually associated with each coil and the magnetic flux from one coil is linked to the other coil by passing through an air gap separating the two coils. As the air gap increases in width, the mutual degree of flux linking becomes less and hence the lesser the effect of the flux of one coil on the other. Also influencing the coils is their environmental temperature especially when it is desired to sense a change of the power in one coil by sensing a reflected change in the other coil. Thus when the air gap is large, the flux linkage relatively inefficient and the environmental temperature range wide, it has heretofore been extremely difficult to provide not only for the transfer of power between the coils but also provide an indication of the circuit to which one coil is connected by sensing a change in a characteristic of the other coil.

It is accordingly an object of the present invention to provide a rotative inductive electrical coupling between a stationary coil and a rotating coil in which both electrical power and a change indication may be transferred from one coil to the other.

Another object of the present invention is to provide a rotative inductive electrical coupling in which a relatively small change in one coil caused by a change in a circuit connected to the other coil may be sensed with reliability even over a wide range of environmental temperatures.

A further object of the present invention is to achieve the above objects with a coupling that is relatively simple in construction, composed of few parts and yet which provides a magnified indication in the stationary part of a change in the condition of a circuit powered by the rotating coil.

In carrying out the present invention, the coupling has particular utility when used with a rotating part that rotates with respect to a stationary part with a circuit rotating with the rotating part. One form of the circuit may have two conditions, one of low impedance and one of high impedance, as may be caused by the two positions, closed and opened, of a switch. The condition of the circuit is desired to be sensed reliably at the stationary part especially over a wide temperature range. Moreover, the parts tend to have a degree of eccentricity with respect to each other which may be relatively substantial and in which the electrical coupling of the present invention between the two parts must accommodate.

The coupling of the present invention has a primary coil that is supported on the stationary part adjacent to and in alignment with a secondary coil that is carried by the rotating part. Each of the two coils has a magnetic core which effects flux linkage between the coils but as the coils have a relatively large air gap which may be on the order of $1/16$ of an inch, the flux linkage is not extensive and hence the transformation is relatively inefficient. When the primary coil is energized with A.C. it induces a voltage in the secondary coil which is used as the electrical power source for a circuit carried by the rotating part with the circuit having two conditions, one of low impedance and the other of high impedance.

In addition another primary coil is wound on the stationary part and is connected to also be energized with A.C. with the first primary coil. However, its magnetic flux and the flux of the other primary coil are essentially isolated from each other to have very little linkage. The impedance of the second primary coil is made to be directly related to the impedance of the primary coil such that when the two coils are connected in a bridge circuit an indication of the change of the impedance of one will provide a signal somewhat magnified of the relative change. The first primary coil may have its effective impedance changed by a change in the condition of the circuit connected to the rotating secondary coil by including the reflected impedance of the secondary coil and this in turn will alter the bridge to provide a signal of the condition of the secondary coil circuit. However, even though the reflected impedance is small to produce only a small impedance change in the first primary coil, the use of two primary coils in essentially the same environmental temperature, maintains the relative impedances of the two primary coils essentially the same over a wide temperature range so that the small reflected impedance change will produce substantially the same effect at any environmental temperature over a wide range.

Other features and advantages will hereinafter appear.

Figure 1:
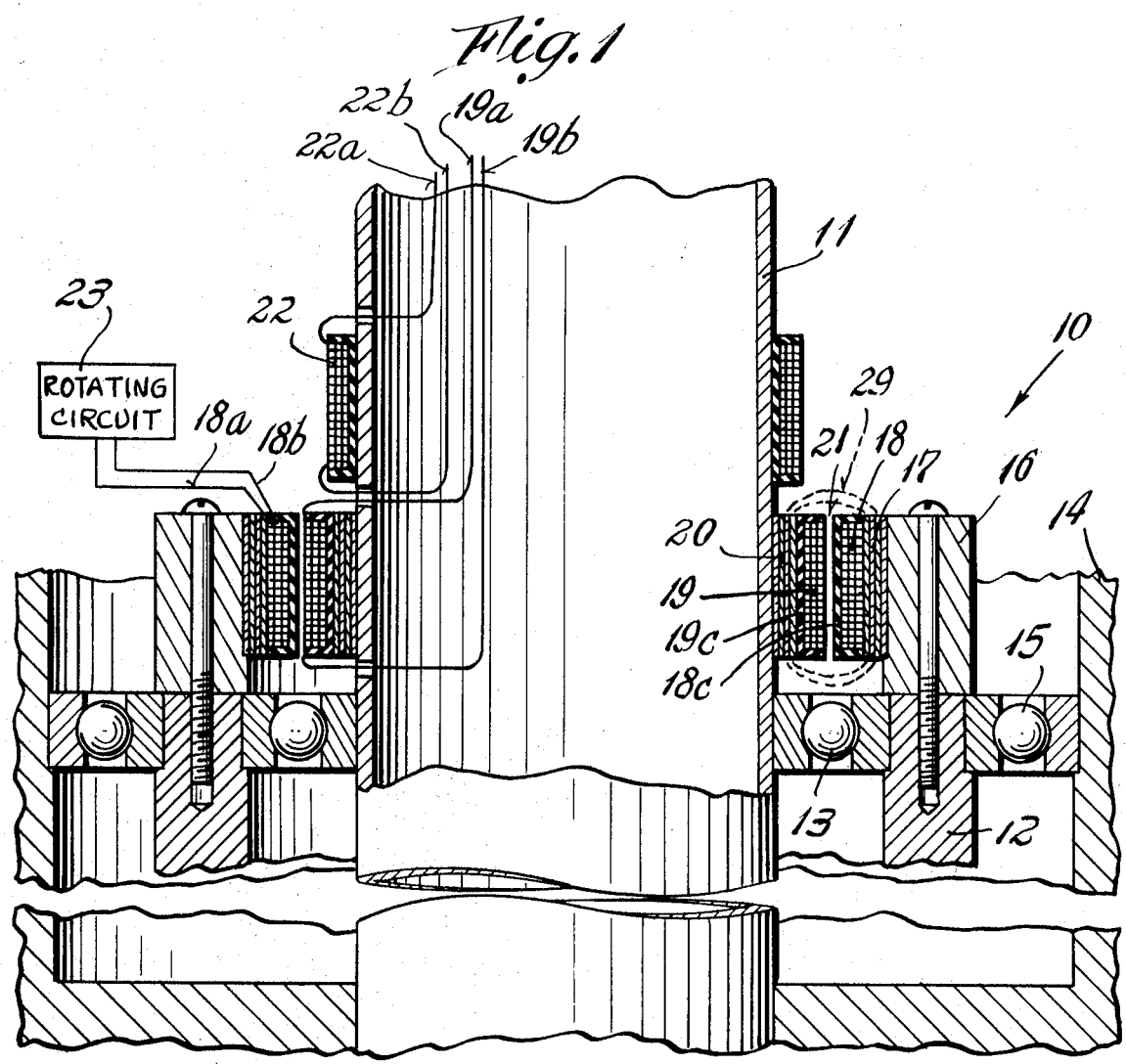
FIG. 1 is a sectional view of the electrical coupling of the present invention shown with respect to rotating and stationary parts.

Referring to the drawing, the coupling is generally indicated by the reference numeral 10 and is shown associated with a stationary tube 11 that is positioned within a rotating hollow shaft 12 by the use of bearings 13. The shaft 12 is externally supported for rotation in a stationary housing 14 through the use of bearings 15. Though ball type bearings are shown, other forms of bearings, such as needle or sleeve bearings, may be used if desired.

Secured on the upper end of the rotating tube 12 in any convenient manner is a support ring 16 which carries on its inner periphery an annular core 17 and an annular secondary coil 18. Axially aligned with the secondary coil 18 is an annular primary coil 19 and an annular core 20 with both being secured on the exterior of the stationary tube 11. An air gap 21 separates the two coils and may be on the order of $1/16$ of an inch to accommodate eccentricity between the tube 11 and the shaft 12. The coils are circularly wound through the use of bobbins 18c and 19c and may be covered with an encapsulating compound (not shown) if desired. The bobbins and/or coil may be secured to the cores in any desired manner such as by the use of adhesives, also not shown. Preferably as shown the cores are formed of a spirally wound strip of magnetic material such as soft iron or steel.

Positioned slightly above the coil 19 on the periphery of the stationary tube 11 is another primary coil 22 that is secured thereto in any convenient manner. However, this coil 22 does not have a core.

The ends 19a and 19b of the first primary coil and the ends 22a and 22b of the other primary coil pass through the wall of the stationary tube to extend outwardly therein from the member. Additionally, the ends 18a and 18b of the secondary coil 18 extend through the open end of the ring 16 to a circuit 23 that is carried with the rotating part to rotate therewith. Insulation and locking bushings may be uilized with the ends and the openings, if desired.

Figure 2:
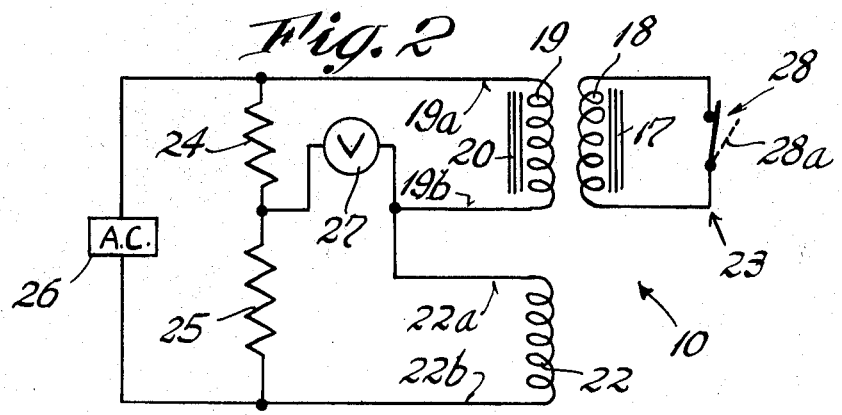
FIG. 2 is an electrical schematic diagram of the coupling and circuits associated therewith.

Referring to the schematic diagram, FIG. 2, the coils 19 and 22 are connected in two legs of a bridge circuit having resistors 24 and 25 connected in the other legs. The bridge circuit is energized from a source of A.C. 26 across one pair of opposite interconnections while the other pair of opposite interconnections formed by the junctions of the resistors 25 and 26 and the coils 19 and 22 have an indicating means connected thereto to measure or otherwise utilize the electrical signal caused by an unbalance of the bridge. It will be understood that while a voltmeter 27 is shown, other indicating devices and/or electrical devices reacting to a determinable level of the signal may be utilized in place thereof.

The circuit 23 is schematically shown and includes a switch 28 connected across the winding 18. Normally the switch 28 is in its solid line closed position which effectively short-circuits the coil 18 but upon an occurrence which the rotating circuit is to detect, the switch arm 28a may be caused to assume its open position which opens the circuit. Thus the switch 28 causes the circuit 23 to have either a low impedance or a high impedance and it will be understood that other devices that change the impedance of the circuit 23 may be employed in place of the switch 28 to provide an indication which is desired to be detected by the indicating means 27.

With the herein described structure, upon the energization of the bridge circuit from the source 26, magnetic flux produced in the coil 19 will be linked with the coil 18 as shown by the dotted lines 29. However, in view of the relatively large air gap, the need for only a small amount of power, and the relatively smallness of the core and coils, only a small transference of power between the two coils is effected and the transformer action has a relatively low efficiency. However, it is sufficient to produce electric power for the circuit 23. The coil 22 is also simultaneously energized from A.C. and its impedance is directly related to the impedance of the coil 19 for the one condition of the circuit 23 when the switch 28 is closed. The coil 22 is positioned sufficiently remote from the coils 18 and 19 so that there is very little flux linkage with the coil 19 and moreover the flux it produces when energized with A.C. is not linked with the coil 18.

The tube 11 is formed of material which has a low permeability, such as aluminum, copper, etc., and thus effectively reduces the impedance of coil 22 to a value approximately equal to that of coil 19 when coil 18 is short-circuited by switch 28. Accordingly, the bridge is balanced and the indicating means 27 will assume a condition which is representative of the condition of the circuit 23.

When the switch 28 is caused to assume its open position, indicating a high impedance in the circuit 23, the coil 18 will effect the coil 19 by increasing its impedance to a larger value than when the switch 28 is closed by reason of the coil 18 impedance being reflected to appear as an additional impedance of the coil 19. This in turn will make the coil 19 have a larger impedance in the bridge circuit than the coil 22 which causes the bridge to become unbalanced, providing a signal on the indicating means 27 which is on the stationary part. When the switch 28 becomes closed again, the reflected impedance and hence the impedance of the coil 19 substantially decreases, causing the bridge to assume its normal state in which it is balanced and hence indicative of the effective short-circuiting of the winding 18.

It will be understood that over a wide temperature range, as for example minus 70 degrees to plus 180 degrees F., there may be as much as a 30% change in the resistance of the wires of the coils. However, as both the coils 22 and 19 are at the same environmental temperature, the resistance change in each is essentially identical and thus will not cause substantial unbalance of the bridge.

It will accordingly be understood that there has been disclosed a rotative inductive electrical coupling which enables transmission of electrical power and signal between a rotating part and a stationary part. The coupling includes one pair of coils having magnetic cores with one coil and core being mounted in the stationary part while the other coil and core are mounted on the rotating part. The coupling is relatively inefficient as the flux linkage of the coils is not substantial but yet is sufficient to enable power to be transferred to the circuit connected to the rotating coil and also to enable the condition of the circuit to be reflected into the stationary coil. Though the effect of the condition on the stationary coil is relatively small, it is made capable of being reliably sensed even over a wide temperature range through the use of another coil secured on the stationary part. Both stationary coils are connected in a bridge arrangement which provides one signal for one condition of the rotating coil circuit and another signal for the other condition. However, as both stationary coils are positioned adjacent to have the same ambient temperature, each will have a similar change due to temperature and thus prevent temperature from effecting the reliability of the bridge signal.

Variations and modifications may be made within the scope of the claims and portions of the improvements may be used without others.

I claim:

1. A rotative inductive coupling for transferring electrical power and information between a rotating part and a stationary part comprising an annular stationary coil mounted on the stationary part, an annular rotating coil mounted on the rotating part, said coils being substantially aligned but spaced by an air gap, core means formed of magnetic material associated with each coil for establishing a flux path, means for connecting one of said coils to a source of A.C., means for connecting the other of said coils to an external circuit having either a low impedance condition or a higher impedance condition, another coil mounted on the part that carries the one coil and having an impedance directly related to the impedance of the one coil when the circuit is in one of its conditions and being essentially remote from the flux path linking the other coils and indicating means connected to the two coils on the one part for providing an indication when the circuit of the other of said coils changes its condition by altering its reflected impedance to the one coil.

2. The invention as defined in claim 1 in which the indicating means includes a bridge circuit having four interconnected legs with means connecting the stationary coil in one leg and means connecting the other coil in another leg.

3. The invention as defined in claim 2 in which the bridge is energized by a source of A.C. at one pair of opposite leg interconnections and terminal means for producing a signal indicating the state of the balance of the bridge is at another pair of leg interconnections.

4. The invention as defined in claim 3 in which the impedance of the another coil is essentially equal to the impedance of the stationary coil for the low impedance condition of the circuit and in which the stationary coil and the another coil are maintained at the same environmental temperature whereby impedance changes in the coils caused by temperature are somewhat identical.

5. The invention as defined in claim 1 in which the another coil is energized with the stationary coil from the source of A.C. and in which the flux of the another coil is substantially free from linkage with the other coils.

6. The invention as defined in claim 5 in which the stationary part is formed of essentially paramagnetic material, in which the one coil and the another coil are disposed on said part in adjacent but spaced relation and in which the core means includes an annular core formed of magnetizable material positioned between said one coil and said part with said core terminating adjacent to but spaced from the another coil.

7. The invention as defined in claim 6 in which the other coil is mounted on the rotating part and the core means also includes an other annular core mounted between said another coil and said rotating part.

8. The invention as defined in claim 7 in which the coils face each other across an air gap and in which the air gap is of relatively large size to thereby render the transformation between the one coil and the other coil relatively inefficient.

References Cited

UNITED STATES PATENTS

| | | | |
|---|---|---|---|
| 2,597,689 | 5/1952 | Welch | 323—53 |
| 2,681,975 | 6/1954 | Leonard | 336—123 X |
| 2,801,382 | 7/1957 | Martino et al. | 323—52 |
| 3,317,873 | 5/1967 | Himmelstein et al. | 336—123 X |

J D MILLER, Primary Examiner

A. D. PELLINEN, Assistant Examiner

U.S. Cl. X.R.

323—52, 53, 75, 90; 336—123